April 14, 1931.  J. L. MORAN ET AL  1,800,558

GOGGLES

Filed Feb. 10, 1930

JOHN L. MORAN
ALVIN J. LEE
  Inventor

By Herbert E. Smith

Attorney

Patented Apr. 14, 1931

1,800,558

UNITED STATES PATENT OFFICE

JOHN L. MORAN AND ALVIN J. LEE, OF SPOKANE, WASHINGTON, ASSIGNORS, BY DIRECT AND MESNE ASSIGNMENTS, OF ONE-FOURTH TO FRANCIS E. P. WILDER, OF SPOKANE, WASHINGTON, AND ONE-FOURTH TO ROBERT MALCOM, OF CHICAGO, ILLINOIS

GOGGLES

Application filed February 10, 1930. Serial No. 427,160.

Our invention relates to improvements in goggles of the type employed by mechanics, machinists, and others, when working with welding torches, abrading or emery wheels, and while working under other conditions that may result in injury to the eyes, or to the lenses worn by those accustomed to use spectacles or eye-glasses. The primary object of the invention is the provision of a pair of goggles for use by a person, who of necessity, is compelled to habitually wear eye-glasses or spectacles, under the above indicated working conditions. While the wearer's eye-glasses or spectacles would protect him from flying particles of metal, or of the abrasive, (when working at an emery wheel the lenses of the spectacles would quickly be ruined. The lenses used in the goggles of our invention, like the lenses used in the ordinary goggles, are inexpensive, and may readily be replaced, but the lenses of the spectacles or eye-glasses, frequently manufactured at great expense according to prescription, are very expensive and hard to replace. Therefore, our invention is designed not only to protect the eyes, but to protect the magnifying lenses of the spectacles worn by the workman.

The invention consists in certain novel combinations and arrangements of parts as will hereinafter be more fully set forth and claimed. In the accompanying drawings we have illustrated one complete example of the physical embodiment of our invention wherein the parts are combined and arranged according to the best mode we have thus far devised for the practical application of the principles of our invention.

Figure 1:
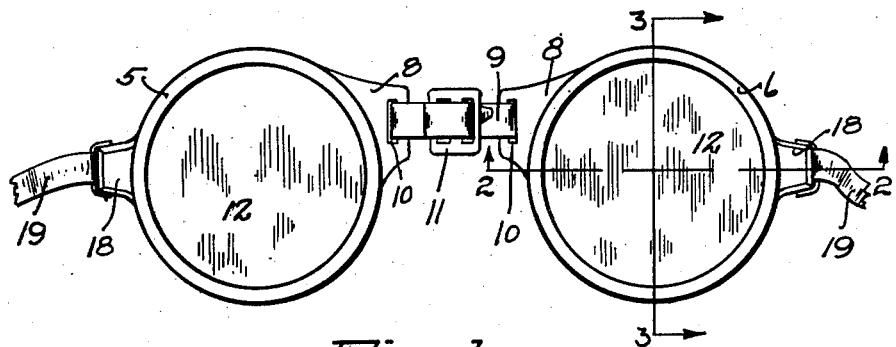

Figure 1 is face view of the goggles of our invention.

Figure 2:
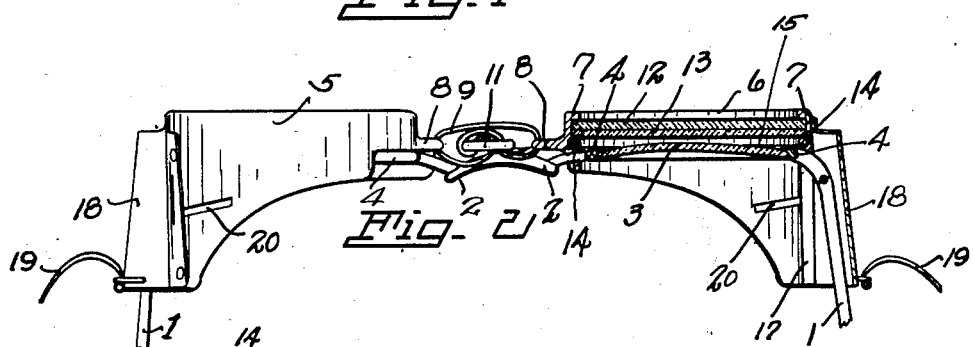
Figures 3, 5:
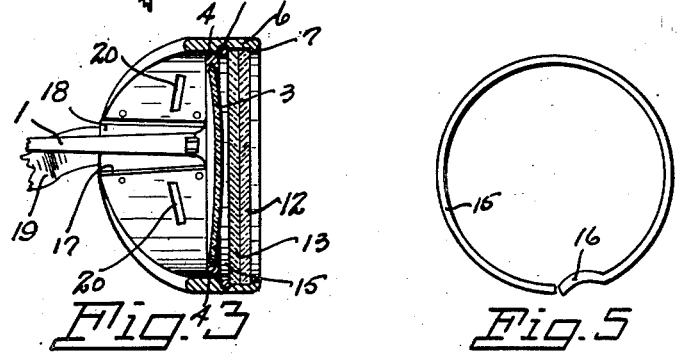
Figure 4:
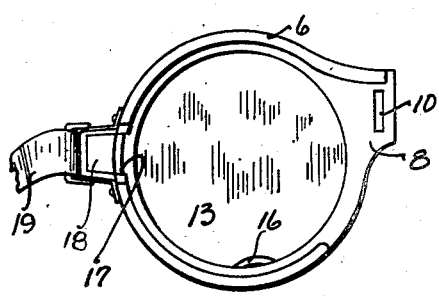

Figure 2 is a bottom edge view of the goggles with one portion in section as at line 2—2 of Figure 1. Figure 3 is a vertical sectional view at line 3—3 of Figure 1. Figure 4 is an inner face view of the left lens holder and lens of the goggles. Figure 5 is a detail view of the split resilient or spring retaining ring for the lenses.

The goggles are of the multi-lens type, made up of two sections or holders, that are joined by a flexible connection or strap, and retained in position for use by a strap around the back of the head.

In order that the general arrangement and utility of parts may readily be understood we have illustrated a common or well known type of spectacles, including the side arms 1, the nose piece or bridge 2, with magnifying lenses 3, and the lens frame or rings 4. The purpose of the invention is to protect the magnifying lenses 3, here shown as of the concavo-convex type, as well as to protect the eyes of the wearer of the goggles.

The goggles comprise two holders or circular frames 5 and 6, each having an outer or front annular flange 7, and slotted flanges 8, the latter arranged complementary to one another as indicated in Figure 1. A strap 9 is passed through slots 10 in the flanges, and an adjusting buckle 11 on the strap is used to adjust the holders in proper position for use. As seen in Figure 4, at its inner side, the circular wall of each holder is omitted or cut away to facilitate the use of the goggles with the spectacles and permit facility in linking the two holders together.

A set of lenses for the goggles includes an outer pair 12 and an inner pair 13, the latter usually colored, and these lenses are usually inexpensive in order that when marred, they may be replaced at low cost.

The pairs of lenses are removable, but are retained in place through the use of an annular, inner groove 14 and a split, resilient retaining ring 15 having an inset finger-nail bend 16. The annular groove is spaced from the annular retaining flange 7 to accommodate the two lenses 12 and 13, and the groove is of sufficient depth to receive the outer peripheral portion of the ring, while its inner peripheral portion overlaps the inner edge of the inner lens 13. The two lenses are thus retained by the ring against the flange 7, and a marred lens may be removed and a fresh one substituted after the retaining ring is removed, the ring of course being replaced after the lenses are replaced by new ones.

The lenses of the goggles, as seen in Figure 3 are located directly in front of the spectacle lenses 3, and therefore shield and protect these lenses as well as the eyes of the wearer.

At the outer sides the holders or members 5 and 6 are fashioned to provide channels 17 to accommodate the side arms 1 of the spectacles; the channels or spectacle arm receiving recesses being preferably formed by providing the side wall extensions 18, which may be substantially coextensive with the width of the outer side walls of the holders. With the nose engaging or inner sides of both members having the laterally disposed portions and the encircling side walls at the lower side of each member or holder terminating short of said lateral portions while the encircling side wall at the upper side of each member or holder extends to the end of the lateral portions, it is apparent that a nose-bridge receiving channel is provided, which, with the channels at the outer sides of the holders or members, permit the goggle to be worn over the spectacle of the user without in any way interfering therewith. A strap 19 with its ends attached to the respective housings, is passed around the back of the head. The strap 19 may be an elastic band, or may be a tie that is fastened at the back of the head, to hold the goggles against forward displacement.

The usual ventilating slits or slots 20 may be used in the holders, if necessary, but the housings 18 afford ventilation at the outer sides of the slotted holders as indicated.

As thus constructed and arranged the goggles of our invention may be worn with comfort and convenience, and the parts, as lenses, may be replaced with facility when necessary, and the goggles provide an efficient protector or shield for the valuable spectacle lenses 3.

Having thus fully described our invention, what we claim as new and desire to secure by Letters Patent is:—

1. A goggle of the character described adapted to fit over the spectacles of the user and comprising a pair of lens holding members yieldingly secured together at the inner nose engaging sides; the walls of said members increasing in width toward the outer sides thereof and each member formed with a portion disposed beyond the perimeter of the lens holding portion to provide a channel for the spectacle side arm.

2. A goggle of the character described adapted to fit over the spectacles of the user and comprising a pair of lens holding members whose walls increase in width toward the outer sides and are formed to provide spectacle side arm receiving recesses, while the inner opposing sides extend laterally to provide a spectacle nose-bridge receiving channel; and means secured to the laterally extending channel portions for yieldingly holding the two members together adjacent to the nose of the user.

3. A goggle of the character described adapted to fit over the spectacles of the user and comprising a pair of lens holding members yieldingly secured together at the inner sides; the walls of the members at the inner sides having portions disposed laterally toward each other, with the side walls increasing in width from the upper edges of the laterally disposed portions toward the outer sides and terminating on the bottom of the goggle adjacent to said laterally disposed portions so as to provide a spectacle nose-piece receiving channel; while the members at the outer sides are formed to provide spectacle side-arm receiving channels.

4. A goggle of the character described adapted to fit over the spectacles of the user and comprising a pair of lens holding members whose walls at the inner sides are formed to provide a spectacle nose-bridge receiving channel; yielding means secured to said channel providing portions for securing the members together; said members at their outer sides beyond the lens holding portions being laterally extended to provide spectacle side-arm receiving portions.

In testimony whereof we affix our signatures.

JOHN L. MORAN.
ALVIN J. LEE.